Figure 1:
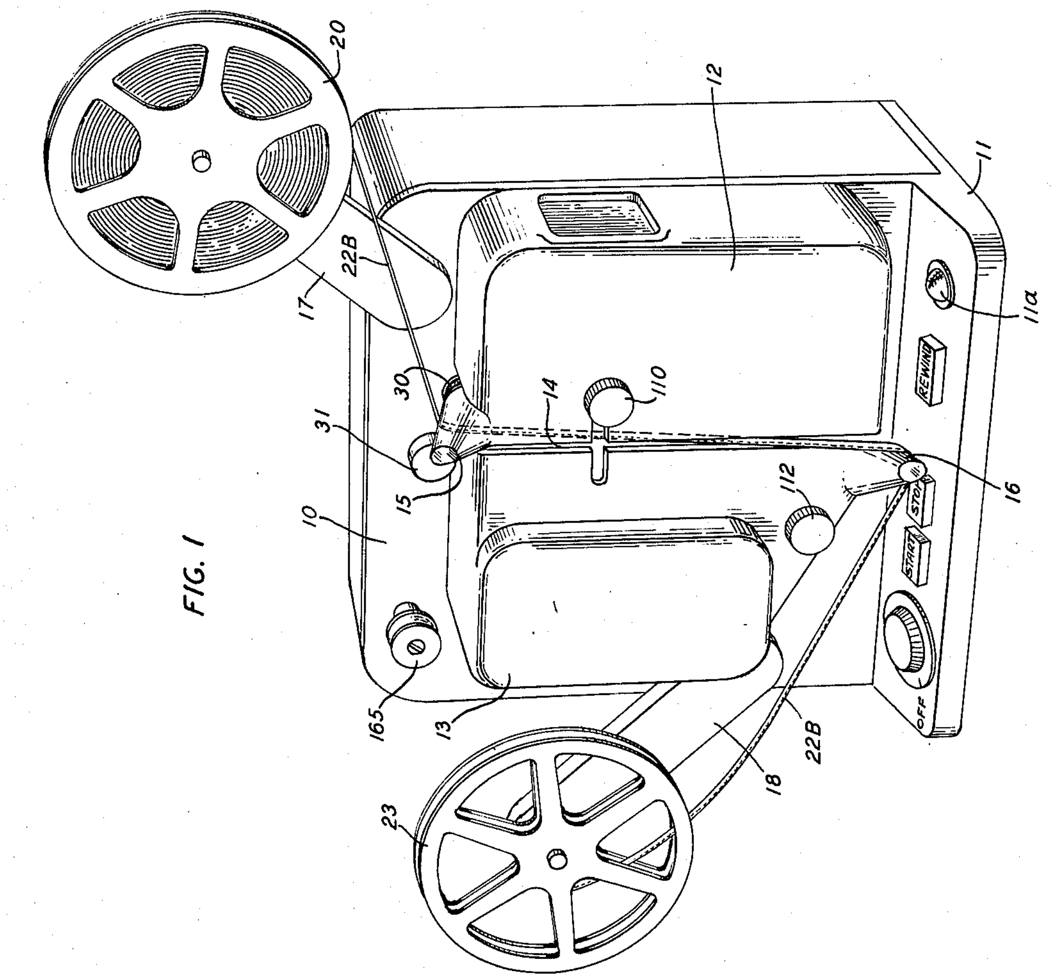

July 5, 1966 J. A. MAURER 3,259,291

MOTION PICTURE PROJECTOR WITH AUTOMATIC EDGEWISE FILM THREADING

Filed July 27, 1962 6 Sheets-Sheet 1

INVENTOR
JOHN A. MAURER
BY
ATTORNEY

July 5, 1966 J. A. MAURER 3,259,291

MOTION PICTURE PROJECTOR WITH AUTOMATIC EDGEWISE FILM THREADING

Filed July 27, 1962

6 Sheets-Sheet 2

INVENTOR
JOHN A. MAURER
BY
ATTORNEY

July 5, 1966 J. A. MAURER 3,259,291

MOTION PICTURE PROJECTOR WITH AUTOMATIC EDGEWISE FILM THREADING

Filed July 27, 1962 6 Sheets-Sheet 3

INVENTOR
JOHN A. MAURER
BY [signature]
ATTORNEY

July 5, 1966 J. A. MAURER 3,259,291

MOTION PICTURE PROJECTOR WITH AUTOMATIC EDGEWISE FILM THREADING

Filed July 27, 1962

6 Sheets-Sheet 4

INVENTOR
JOHN A. MAURER
BY
ATTORNEY

July 5, 1966  J. A. MAURER  3,259,291
MOTION PICTURE PROJECTOR WITH AUTOMATIC
EDGEWISE FILM THREADING
Filed July 27, 1962  6 Sheets-Sheet 5

INVENTOR
JOHN A. MAURER
BY
ATTORNEY

July 5, 1966 J. A. MAURER 3,259,291

MOTION PICTURE PROJECTOR WITH AUTOMATIC
EDGEWISE FILM THREADING

Filed July 27, 1962 6 Sheets-Sheet 6

INVENTOR
JOHN A. MAURER
BY
ATTORNEY

United States Patent Office 3,259,291
Patented July 5, 1966

1 2

3,259,291

MOTION PICTURE PROJECTOR WITH AUTOMATIC EDGEWISE FILM THREADING

John Andrew Maurer, Somerset, N.J., assignor, by mesne assignments, to McGraw-Hill Book Company, Inc., New York, N.Y.

Filed July 27, 1962, Ser. No. 212,858
6 Claims. (Cl. 226—196)

This invention relates to motion picture projectors, and in particular to portable motion picture projectors made to use the smaller sizes of film, such as 16 mm. and 8 mm. film.

In order to operate the great majority of the projectors that have been made in the past, it is necessary to "thread" the film manually, that is, pass it around various toothed sprockets, through the picture gate, and, in the case of sound projectors, around various rollers in the sound reproducing mechanism, placing the perforations in the film in mesh with the teeth of the sprockets before closing guide members which afterward hold the film in contact with these sprockets, and establishing loops of the correct lengths between the sprockets and the other parts of the mechanism through which the film passes.

In practice many people find the threading of the film a complicated and difficult operation. If the film is threaded incorrectly it is likely to be damaged, and even if this does not occur the performance is likely to be unsatisfactory; for example, the sound may be reproduced out of synchronism with the action in the picture. Because of this difficulty and because of the fear of damaging film, many people, as for example school teachers, who would otherwise have good reasons for using motion picture films and projectors tend to avoid doing so.

In order to overcome the difficulty of the manual threading of film, "self-threading" projectors have been built in which the end of the film leader is introduced endwise into a slot or chute which leads it to the first toothed sprocket, against which it is pressed by a resiliently mounted guide so that the teeth of the sprocket are able to find their way into the perforations of the film and drive it forward when the mechanism is put in motion. As the film is advanced the leading end of it is guided by a series of curved members which force it to travel in succession to the other parts of the mechanism in such a way that it is engaged successively by the various driving members and sprockets, and loops of the correct lengths are formed where required between the various parts of the mechanism. When the leading end of the film has been carried through the complete threading path it emerges from the mechanism and at this point it is necessary to attach it to the take-up reel. This may be accomplished by causing such end of the film to emerge in a position where it will drop into contact with the hub of a reel that is provided with small hooks to engage the perforations. This, however, is not completely reliable, and, furthermore, the user may place on the take-up spindle a reel that does not have the necessary small hooks; therefore, it is usually necessary to stop the mechanism in order to attach such end of the film to the reel. When the mechanism is again put in motion to project the film it is also necessary in some way to withdraw the curved threading guides from contact with the film, so that the film in the loops can move freely. This may be accomplished automatically or by a separate manual control.

The type of "self-threading" projector just described has several disadvantages. First of all, successful engagement of the perforations in the film with each of the sprockets depends on the condition of the end of the film strip; this must not have a sharp bend anywhere near the leading end region (such as is often produced by attaching the film to a reel); the perforations at the end of the strip must not be torn, and the spaces between them must not be indented. In order to obtain a film end that is in proper condition to operate with the self-threading mechanism, it is often necessary to cut off a few frames of film with scissors before presenting the end of the film to the machine. Even if this is done the end of the film is usually damaged to a slight extent each time it enters the mechanism, so that after the film has been used a few times it is again necessary to cut off the film to obtain a clean end.

If the film end is not in good condition it is likely to be damaged further by the first sprocket in the projector, to such an extent that it will become jammed at some later point in its path. If this occurs a pile-up of film results, and a considerable length of film may be damaged.

While this sequential or endwise-feeding type of self-threading mechanism has been applied with some success to projectors of silent motion pictures, it is much more difficult to make it operate successfully in sound-projectors because a more complicated film path is required to achieve the extremely steady film motion at the sound reproducing point that is necessary for good sound reproduction.

The major object of the present invention is to provide projectors for silent and for sound motion pictures which are so simple to operate they may be used successfully and without damage to film by persons who are not mechanically minded or skilled and who are without previous experience in the handling of motion picture film, as also by children of early school age.

A second object of the invention is to provide a projector equipped with two readily accessible guide-members about which the leader of the film can be passed easily as, for example, by a movement of one hand, these members being formed with inclined surfaces to provide the guidance that is necessary to cause the film to enter the correct path of subsequent engagement with the cooperating parts of the mechanism when the leading end of the film is attached to a take-up reel and the slack of the film is wound on the reel.

A third object of the invention is to provide a projector mechanism into which a strand of film can be inserted edgewise into a slot.

These and other objects which will become apparent in the course of this description are accomplished by the mechanism shown in the accompanying figures of the drawing, in which, collectively, may be seen:

(1) An upright supporting plate attached at right-angles to a base, and carrying hinged arms which may be extended to support film reels.

(2) A slotted enclosure for the film handling picture projecting and sound-reproducing parts of the mechanism, which enclosure may be made up of two cover members each of which carries a projecting film guide member and which are attached to the upright supporting plate in such a way that they form between their adjacent edges a continuous slot without sharp bends, for example, a substantially straight slot.

(3) A set of three push-buttons mounted in the base and marked "START," "STOP," and "REWIND."

The sequence of events in placing the projector in operation is as follows:

A reel of film is placed on the feed-spindle, supported by the upper arm of the machine. An empty reel is placed on the take-up spindle on the lower arm. A length of approximately two feet of film is unwound or pulled away from the feed-reel; this film is passed above and to the left of the upper film guide member (using "right" and "left" in terms of the figures of the drawing) and it is then passed to the right of and below the lower film guide member. The leading end of the film is then attached to the take-up reel and this reel is rotated until whatever slack film was present has been wound up on the hub of the take-up reel. Since this places the film under a slight tension, that portion of the film which is around and between the guide members slides down their inclined surfaces, and comes to rest in a position which is determined by channels at or near the feed-in sprocket and the idler just below the hold-back sprocket. These channels, which are preferably formed by flanges on, or cooperating with, said sprocket and idler, together with portions of the circumferential surfaces of the sprocket and idler, hold the film laterally in a position where the perforations are in line with the teeth of the feed and hold-back sprockets and the film as a whole is in line with the guides associated with the picture projection aperture, the projection lens, and, in the case of a sound projector, the film supporting surface of the sound-reproducing drum. The parts just mentioned and the projector driving motor are not shown in the drawing, being well known and customarily found in motion picture projectors.

The "start" button is now pressed down; it locks into its downward position and closes switches which apply electric power to the projector driving motor in such a way as to cause it to rotate in the forward direction. As soon as the driving motor begins to rotate, mechanism located inside the cover plates (shown in FIGURE 1) begins to operate in such a way that in a few seconds the necessary film loops are formed and the film is brought into operating relationship with the parts necessary to accomplish the projection of the picture and, in the case of a sound projector, the reproduction of the sound.

Figure 1B:
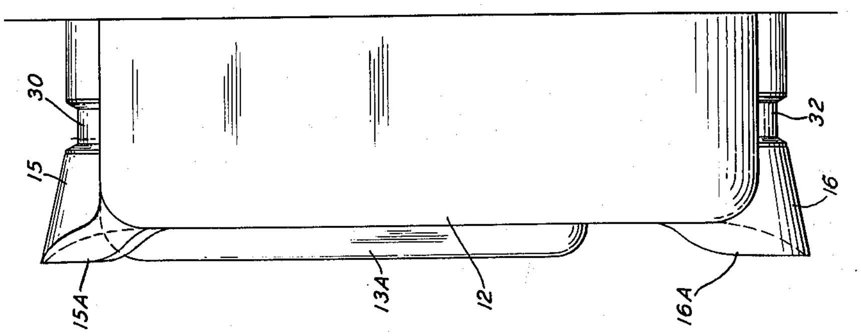
Figure 1A:
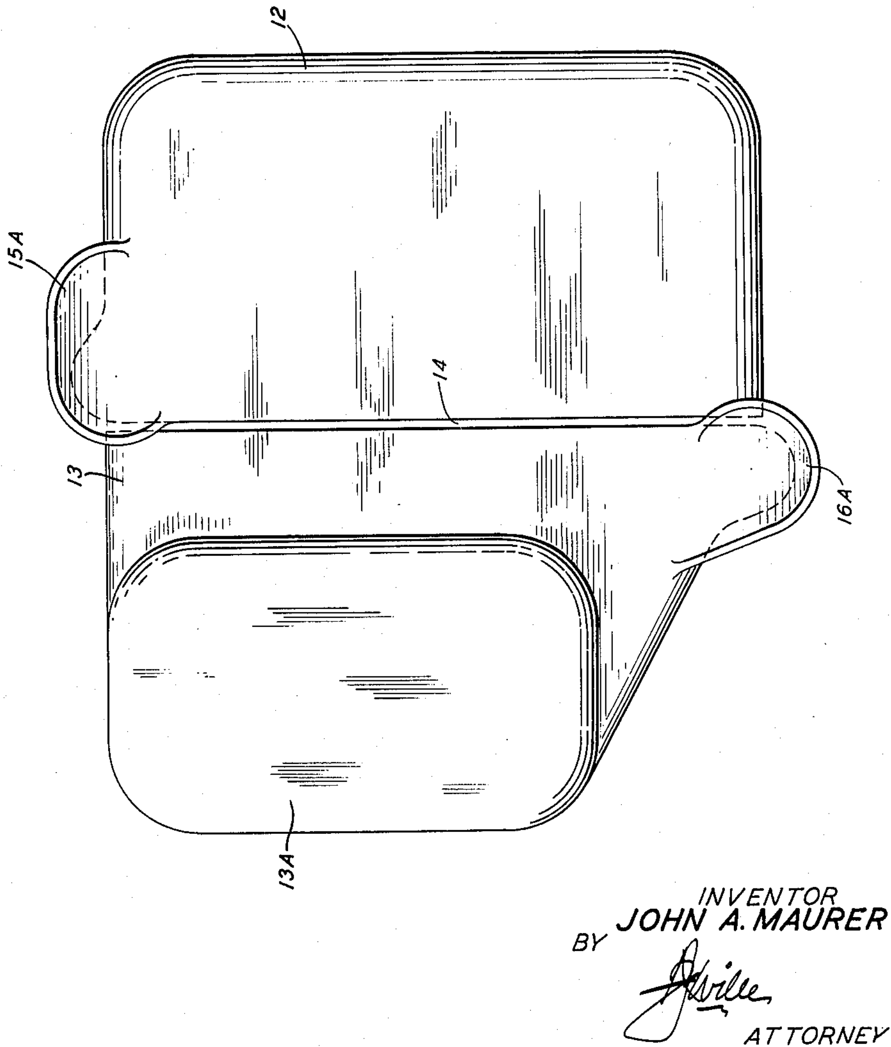
Figure 1D:
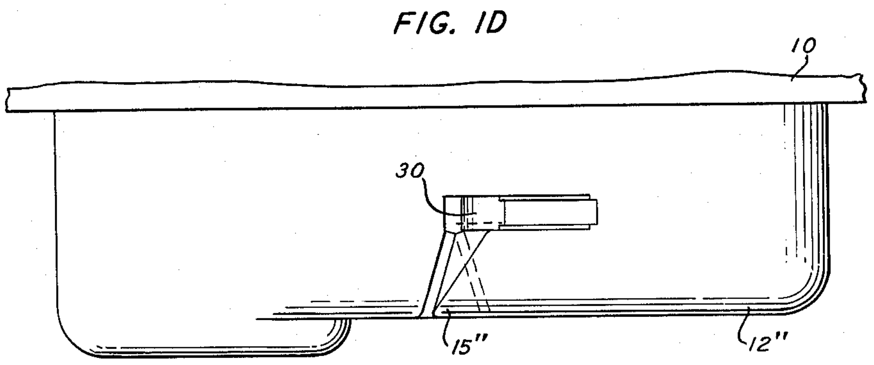
Figure 1C:
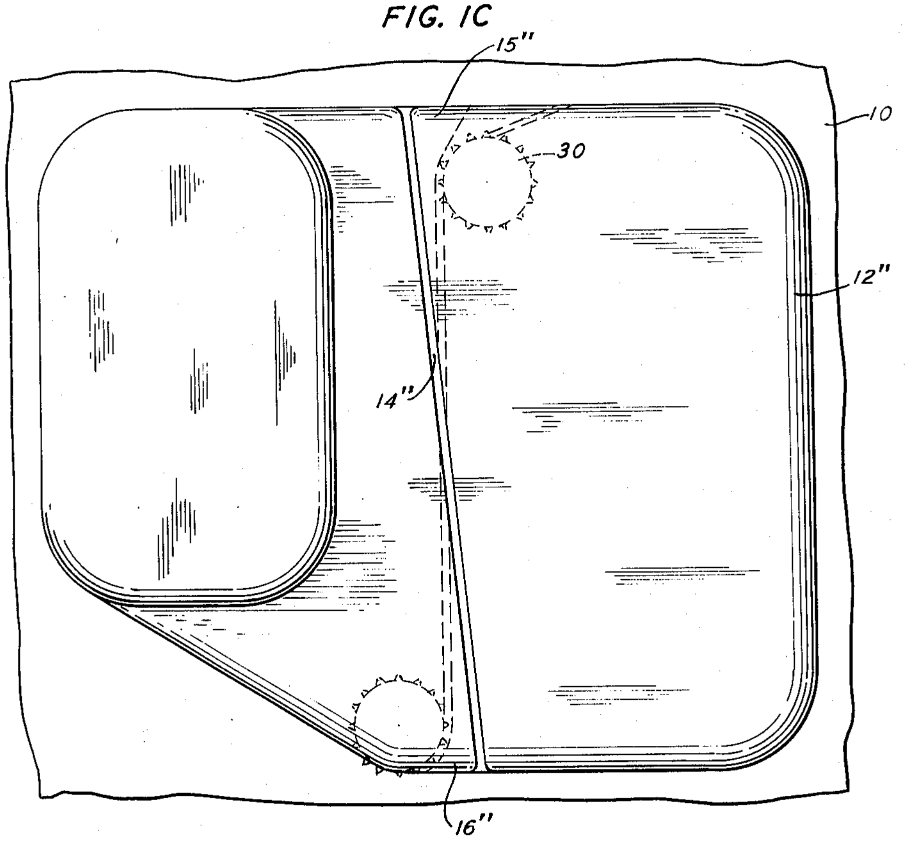

What has been stated above will be better understood from the detailed description which follows, taken in connection with the drawing, in which:

FIG. 1 is a perspective view of an illustrative embodiment of the portable motion picture projector in accordance with my invention;

FIGS. 1A and 1B are a front and end view, respectively, showing a slightly modified version of the front covers of the embodiment of FIG. 1 with guide ridges on the covers for coacting with the guide members thereof in the initial insertion of the film; FIGS. 1C and 1D are a front and top view respectively showing another modified version of the front mechanism enclosure portion of the projector in which a single cover is used having a slot formed in its front wall and in which the film guide members, which are integral with this cover, do not project forward or upward beyond the limits of the walls of the cover.

Figure 2:
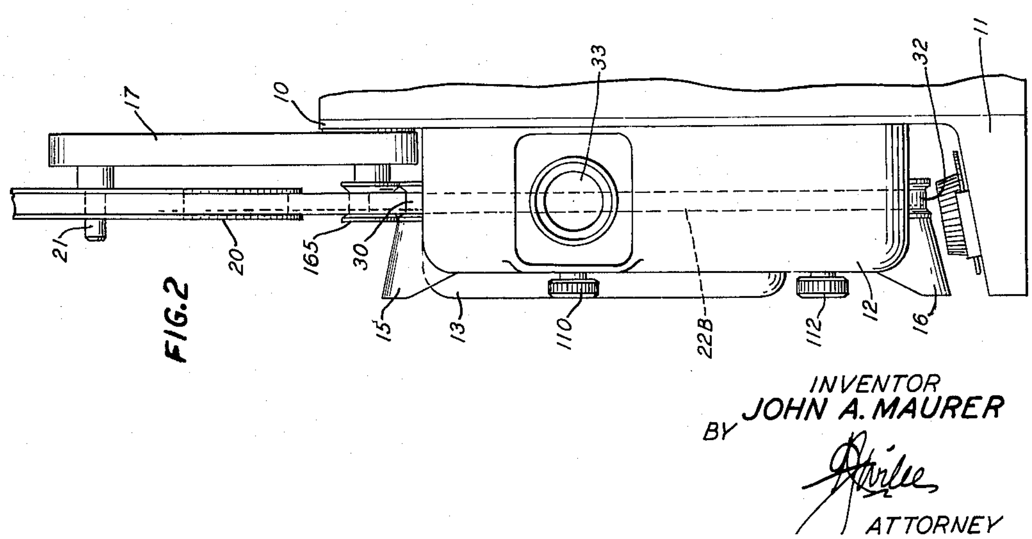
Figure 2A:
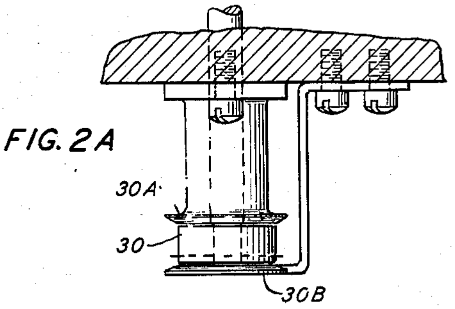
Figure 2B:
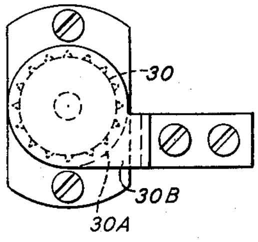
Figure 2C:
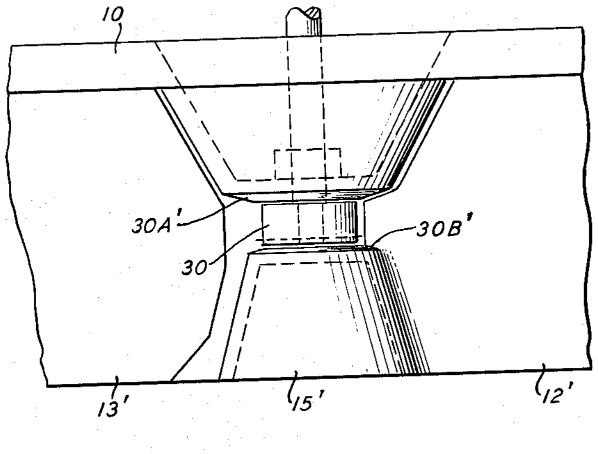
Figure 2D:
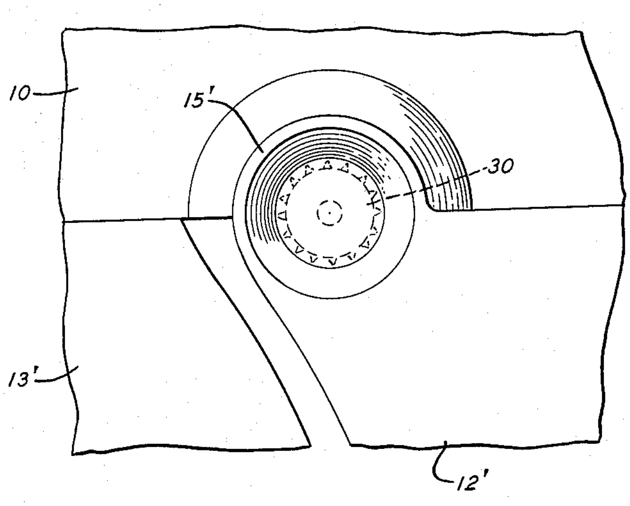

FIG. 2 is a front-elevational view of the projector of FIG. 1;

FIGS. 2A and 2B are, respectively, a top and a front view, of an alternative construction in which the upper-film sprocket has associated with it fixed lateral flanges instead of integral rotating flanges for assuring accurate lateral positioning of the film at the feed-in of the projector; FIGS. 2C and 2D are respectively a top and a front view of a second alternative construction in which the main supporting casting and one of the front cover-plates are formed so that they provide film positioning surfaces adjacent respectively to the rear and to the front of the upper film sprocket drum so as to assure accurate lateral positioning of the film entering the projector.

The film guide members, 15 and 16, which are either attached to or integral with the two cover-members, may be of the form of inclined truncated cones, as shown in FIGS. 1 and 2, or they may be larger extended edge-portions, for example ridges 15A and 15B of these cover members as shown in FIGS. 1A and 1B. The degree of convenience with which film can be placed in cooperating relation to the projector is obviously increased if each film guide member extends outward farther from the main vertical support plate 10 than the adjacent part of the other cover on the other side of the slot, but this is not a necessary condition. What is essential is that the surface of each guide member on the side that faces away from the body of its cover is inclined so that the part farthest from the vertical support plate 10 is also farthest from the center of the cover. Because of the inclination of this surface a strand of film placed around either guide member and subjected to a slight endwise tension will slide laterally in the direction toward the vertical support plate. A strand of film carried around the outer part of one guide member, then parallel to the slot, and then around the other guide member, and subjected to a slight endwise tension, will slide on both guide members so that the portion between the two guide-members will be carried into the slot.

A reel 20 carrying film to be projected is placed on the spindle 21 of the reel-support arm 17, and the end 22A of the film is pulled off to a length of approximately two feet. This film end, or leader, is passed loosely around the two film guide-members 15 and 16. The end of the film leader is then attached to the hub of an empty film reel 23 which is placed on the spindle 24 of the reel-support arm 18. The reel 23 is next rotated until the slack in the film has been wound up. When this has been done the film will have slipped toward the support plate 10 on the inclined surfaces of the guides 15 and 16 and will be in the position shown by the heavy solid line 22B. As may be seen in the figure, the central part of this path 22B, in which the film lies when it is under slight tension, coincides with the slot 14.

The action of the film guides 15 and 16 may be understood better from a consideration of FIG. 2 in which it may be seen that the top surface of film guide 15 and the bottom surface of film guide 16 slope toward each other and toward the axes of rotation of the adjacent sprocket and roller respectively as they go back from their projecting ends toward the plate 10. These slopes end at the sprocket 30 and the roller 32, respectively. As shown in FIGS. 2, 2A, 2B, 2C and 2D, for sprocket 30, sprocket 30 and roller 32 cooperate with tapering flanges which may be integral with such sprocket or roller as shown in FIG. 2, or, as shown at 30A and 30B in FIGS. 2A, 2B, 2C and 2D, they may be affixed, for example, to support plate 10 or integral with it or with cover 12, and located adjacent to the sides of the roller or sprocket, forming with the cylindrical bearing surface of the said roller or sprocket a channel just wide enough to receive the film. When the film, as it passes around guides 15 or 15A and 16 or 16A, is placed under slight tension, therefore, it slides away from the projecting ends of said guides and comes to rest in the channels of sprocket 30 and roller 32, with the portion of film between sprocket 30 and roller 32 in a straight vertical path inside the enclosure slot 14 or 14' through which it has entered. This is shown in FIG. 2 by the vertical dotted lines marked 22B, which indicate the two edges of the film in this part of its path. As may be seen in this drawing, this vertical film path is in line with the projection lens 33. The tensioning of the film, bringing it into a straight path between sprocket 30 and roller 32, has brought its center line into the plane in which the generally S-shaped threading pattern is to be formed.

It is convenient to place an idler roller or a sprocket at the point where the film leaves the mechanism, and therefore it is in the channel formed by this idler roller and its flanges that the film comes to rest when it slides from the inclined surface of the lower threading guide 16. So also an idler roller might be placed at the input point of the mechanism in place of sprocket 30, the sprocket being moved to a position where it could receive the film coming in over this idler roller. Neither of these changes would affect the essential mode of operation of my invention.

I have described the sprockets and idler rollers to which the film is directed by the film-guide members as being provided with flanges, either integral or stationary, which, together with the sprockets and rollers create channels into which the film can be fed. It would be possible, and in some cases desirable, to shape a casting serving the purposes of plate 10 so that it would have a projecting boss or a hollow hump at the back of the sprocket or roller, this boss or hump extending far enough forward to permit its front surface to serve the purpose of the rear flange in confining the film to a path in line with the sprocket or roller. It would also be possible to shape a portion of the back surface of either of the covers 12 and 13 in the part adjacent to the sprocket or roller so that it would serve the purpose of the front flange in creating the film receiving channel including the sprocket or roller. I have illustrated this construction in FIGS. 3C and 3D.

I have also illustrated in FIGS. 1C and 1D an alternative construction of the enclosure of the picture projection and sound reproducing mechanism in which a single cover member is used—marked 12′ in these figures—and this cover includes as integral parts of itself two film-guide members 15′ and 16′ which do not project forward beyond the limits of the front of the main part of the cover. These guide-members also do not project upward or downward beyond the rest of the cover.

The functioning guide-surface of each of these guide-members conforms to the rule already stated—they slope toward the axes of rotation of the associated sprockets (or idler rollers) going in the direction toward the supporting frame of the projector. In this case it is necessary for the user actually to insert the film edgewise into the slot in this cover, but there is no need to do this with any special care or accuracy. Once the film has been passed around both guide members a slight tension on it will cause it to slide laterally on the guide surfaces and seat itself in the channels at the top and bottom of the enclosure. This places the film in the correct position for subsequent mechanical completion of the threading.

It should be noted that in this construction the film positioning channel at the top of the cover is formed completely in the material of which the cover is made, it does not include the sprocket, but leads the film to the said sprocket in such a position that the perforations in the film are in line with the teeth of the sprocket when they reach it. The bottom of the channel is formed with central relief in such a way that film sliding over this surface is not scratched in the area carrying the picture and sound-record. However, the film will slide over the bottom surface of the channel only if an unusually full reel is placed on the feed-reel arm, and then only for a short time.

Various other modifications of one or more details of the illustrative embodiment will suggest themselves to those skilled in the art but will still fall within the scope of my invention.

What I claim is:

1. In a projector for motion picture film, a roller, a guide flange at each lateral end region of the roller, the guide flanges being spaced apart slightly more than the width of the film and forming with the cylindrical surface of the roller a channel into which film may be fed, and a guide member located in proximity to the roller having a guide surface inclined toward the axis of rotation of the roller in the direction toward the roller, the inclined surface being positioned relative to the nearer one of the guide flanges with its edge nearest the roller slightly farther from the axis of rotation of the roller than the outer edge of the guide flange in such manner that a strand of film drawn around the inclined surface and subjected to a slight tension will slide laterally toward the roller and past the nearer lateral guide flange, terminating such slide by leaving the inclined surface and seating itself in the channel.

2. In a projector for motion picture film according to claim 1 in which the roller is adapted to support film as it is fed into the projector, a second roller spaced from said first roller to support film as it is fed from the projector, means for advancing the film after it has been fed into the projector and before it is fed out of the projector, an enclosure for the said advancing means, the enclosure having a slot which extends from a point in proximity to the first roller to a point in proximity to the second roller for laterally inserting thereinto a strand of film, the second roller having a guide flange in each lateral end region, the guide flanges of the second roller being spaced apart slightly more than the width of the film and forming with the cylindrical surface of the second roller a second channel into which film may be fed, and a second guide member located in proximity to the second roller and having a guide surface inclined toward the axis in the direction toward the second roller, the inclined surface of the second guide member being positioned relative to the nearer one of the guide flanges of the second roller with its edge which is nearest the roller slightly farther from the axis of rotation of the roller than the outer edge of the guide flange in such manner that a strand of film drawn around the inclined surface of the second guide member and subjected to a slight tension will slide laterally toward the second roller and past the nearer lateral guide flange, terminating the slide by leaving said inclined surface and seating itself in the second channel.

3. In a motion picture projector according to claim 2, a support plate mounting the film advancing means between the first and second rollers, and at least one cover forming with the support plate the enclosure for the film advancing means, in which the cover defines a slot from a point in proximity to the first roller to a point in proximity to the second roller for edgewise insertion of the film into the enclosure.

4. In a projector for motion picture film, a sprocket positioned so as to draw film from a supply and support it while it is being fed into the projector mechanism, two first guide flanges spaced apart slightly more than the width of the film adjacent to the two lateral ends of the sprocket and forming with the cylindrical surface of the sprocket a first channel into which film may be fed, a first guide member located in proximity to the sprocket and having a guide surface inclined toward the axis of rotation of the sprocket in the direction toward the sprocket, a roller positioned for supporting film as it is fed to pass out of the projector mechanism over the roller, two second guide flanges spaced apart slightly more than the width of the film adjacent to the two lateral ends of the roller and creating with the cylindrical surface of the roller a second channel, a second guide member located in proximity to the roller having a guide surface inclined toward the axis of rotation of the roller in the direction toward the roller, the inclined surfaces of the first and second guide members being positioned relative to the nearer flange of the first and second pairs of guide flanges respectively in such manner than a strand of film drawn around the inclined surfaces, respectively of the first and second guide members, and subjected to slight tension will slide laterally toward the sprocket and the roller, terminating the slide by leaving the inclined surfaces and seating itself in the first and second channels.

5. In a motion picture projector according to claim 4 and having film advancing means, a support plate mounting the film advancing means, and a cover forming with the support plate a housing for the film advancing means, in which the cover defines a slot extending from a region in the vicinity of the sprocket to a region in the vicinity of the roller, and at least one of the guide flanges is a stationary surface at the free end of a boss integral with one of the support plates and the cover.

6. In a motion picture projector, a feed-in sprocket for drawing film from a supply and feeding it into the projector, a take-up sprocket for drawing film from the projector, means for advancing the film between the feed-in sprocket and the take-up sprocket, an enclosure for the film advancing means, the enclosure having a slot extending from a point in proximity to the feed-in sprocket to a point in proximity to the take-up sprocket for lateral insertion of film thereinto, a pair of lateral guide flanges spaced apart slightly more than the width of the film located adjacent the ends of each of said sprockets and extending radially farther from the axis of rotation of each sprocket than the cylindrical surface of the sprocket, each pair of flanges forming with the cylindrical surface of its associated sprocket a channel within which the film may be fed, and a guide member located in proximity to each of said sprockets, each guide member having a guide surface inclined toward the axis of rotation of its associated sprocket in the direction toward said sprocket, each said inclined surface being positioned relative to the nearer lateral guide flange of the associated pair with the inclined surface edge the nearer the sprocket slightly further from the axis of rotation of the sprocket than the edge of the lateral guide flange and also with that part of said edge which is nearest to the center line of the corresponding end of the slot substantially in line with that part of the slot, in such manner that a strand of film around the inclined guide surface of the guide member associated with the feed-in sprocket and also drawn about the inclined guide surface of the guide member associated with the take-up sprocket upon being subjected to a slight tension will slide laterally toward the sprockets and into the slot and end by sliding from the guide surfaces into the channels.

References Cited by the Examiner

UNITED STATES PATENTS

| | | | |
|---|---|---|---|
| Re. 14,694 | 7/1919 | Uebelmesser | 226—12 |
| 137,417 | 4/1873 | Campbell | 242—157 |
| 702,546 | 6/1902 | Dowell | 226—111 |
| 1,052,209 | 2/1913 | Bingham | 226—76 |
| 1,882,303 | 10/1932 | Seaholm | 226—76 |
| 2,017,855 | 10/1935 | Foster | 352—158 |
| 2,109,451 | 3/1938 | Loomis | 242—76 |
| 2,219,731 | 10/1940 | Zimmerman | 226—90 |
| 2,410,711 | 11/1946 | Canady | 226—111 |
| 2,511,232 | 6/1950 | Wittel | 226—36 |
| 2,570,176 | 10/1951 | Wittel | 226—36 |
| 2,678,820 | 5/1954 | Masterson | 226—9 |
| 2,916,228 | 12/1959 | Wellington | 242—76 |
| 3,045,538 | 7/1962 | Kotte | 226—196 |

M. HENSON WOOD, Jr., *Primary Examiner.*

ANDRES H. NIELSEN, ROBERT B. REEVES, *Examiners.*